United States Patent
Gawda et al.

(10) Patent No.: US 10,749,708 B2
(45) Date of Patent: Aug. 18, 2020

(54) NETWORK TRANSMISSION OF USB TRAFFIC

(71) Applicant: Orange, Paris (FR)

(72) Inventors: Konrad Gawda, Warsaw (PL); Kamil Dabrowski, Warsaw (PL); Sebastian Nowosielski, Warsaw (PL)

(73) Assignee: ORANGE, Paris (FR)

( * ) Notice: Subject to any disclaimer, the term of this patent is extended or adjusted under 35 U.S.C. 154(b) by 53 days.

(21) Appl. No.: 16/065,722

(22) PCT Filed: Dec. 14, 2016

(86) PCT No.: PCT/IB2016/001928
§ 371 (c)(1),
(2) Date: Jun. 22, 2018

(87) PCT Pub. No.: WO2017/109574
PCT Pub. Date: Jun. 29, 2017

(65) Prior Publication Data
US 2019/0013961 A1    Jan. 10, 2019

(30) Foreign Application Priority Data
Dec. 24, 2015   (EP) ..................................... 15307139

(51) Int. Cl.
*H04L 12/40*    (2006.01)
*G06F 21/60*    (2013.01)
(Continued)

(52) U.S. Cl.
CPC .... *H04L 12/40143* (2013.01); *H04L 47/2433* (2013.01); *H04L 47/2491* (2013.01)

(58) Field of Classification Search
CPC ........... H04L 12/40143; H04L 47/2491; H04L 47/2433
See application file for complete search history.

(56) References Cited

U.S. PATENT DOCUMENTS

| | | | |
|---|---|---|---|
| 8,068,495 B2 * | 11/2011 | Fleming | H04L 69/22 370/392 |
| 2007/0083491 A1 * | 4/2007 | Walmsley | G06F 21/608 |

(Continued)

FOREIGN PATENT DOCUMENTS

WO    WO 2015-064838    5/2015

OTHER PUBLICATIONS

International Search Report and Written Opinion dated Feb. 20, 2017 for Application No. PCT/IB2016/001928.
(Continued)

*Primary Examiner* — Kiet Tang
(74) *Attorney, Agent, or Firm* — Knobbe, Martens, Olson & Bear, LLP (57) ABSTRACT

Transport packets comprising Universal Serial Bus (USB) packet data are transported over a communications network in a manner adapted to the USB context of the USB data transfers the USB packet data belongs to. A transport packet comprising USB packet data has assigned thereto at least one quality-of-service parameter value that depends on the USB context of the USB data transfer applicable to the USB packet data. A USB-data source device is configured to run a computer program causing it to expose the respective USB contexts of the USB data transfers applicable to USB packet data of the transport packets it outputs. The USB-data source device (or its sink) may inform the network of the relationship between transport packets and USB contexts of USB data transfers. The network may include a node device which discriminates the USB contexts of the USB data transfers applicable to USB packet data in transport packets and maps the transport packets to quality-of-service parameter values based on the discriminated USB contexts.

11 Claims, 6 Drawing Sheets

(51) Int. Cl.
    *G06F 21/85*     (2013.01)
    *H04L 29/06*     (2006.01)
    *H04L 12/851*     (2013.01)
    *H04L 12/857*     (2013.01)

(56) References Cited

U.S. PATENT DOCUMENTS

| | | |
|---|---|---|
| 2012/0012241 A1 | 1/2012 | Grooms et al. |
| 2012/0300630 A1 | 11/2012 | Abel et al. |
| 2014/0215637 A1* | 7/2014 | Moore .................. G06F 21/85 |
| | | 726/27 |
| 2016/0285645 A1* | 9/2016 | Kim .................. H04L 12/40143 |

OTHER PUBLICATIONS

Copeland, "Network Intelligence—Facilitate Operators Win in Mobile Broadband Era", Intelligence in Next Generations Networks, 2009, 13th International Conference On, IEEE, pp. 1-6.

* cited by examiner

S21 — Applying pre-configured template f(USB transfer type/ USB pipe type)

S02a — Assigning QoS indicator(s) based on USB context

FIG.3B

S22 — Applying dynamically-defined template f(specific USB transfer)

S02b — Assigning QoS indicator(s) based on USB context

NETWORK TRANSMISSION OF USB TRAFFIC

The present invention relates to the field of data transmission and, in particular, to the transmission of USB traffic over a communications network.

Universal Serial Bus (USB) is an industry standard which defines cables, connectors and communications protocols used in a bus for connection, communication and power supply, notably between computers and peripherals. USB Implementers Forum, Inc. develops and maintains the USB specification. Nowadays many devices implement the USB version 2.0 specification, but more recently so-called "superspeed USB" (version 3.0/3.1 Gen 1 specification) devices have been deployed. The present invention is not limited having regard to which version/release of the USB specification is being implemented.

USB communication is based on the notion of logical channels (referred to as "pipes") between a host controller in a USB host and "endpoints" in a USB device connected to the USB host; software (including firmware, operating systems, and application software) transmits data over these logical channels. There are two types of pipes: message pipes and stream pipes. Message pipes are bi-directional and are used for control transfers (e.g. transfers used for conveying commands and status) whereas stream pipes have a defined single direction of flow.

In accordance with the USB protocol, various other requirements are defined for transmissions that may take place via stream pipes, for example: what transfer type (see below) takes place over the pipe, how much bandwidth is allocated to the pipe, what is the maximum size of packet that may be transferred over this pipe, and so on. These requirements are determined at enumeration (performed when a USB device connects to a USB host).

An endpoint which transmits data to the USB host is an "IN" endpoint. An endpoint which receives data from the USB host is an "OUT" endpoint. A given USB device may include up to 16 "OUT" endpoints and up to 16 "IN" endpoints (with endpoint 0 being reserved for control operations). Plural endpoints that are involved in implementation of a particular function may share a common interface. An interface represents a functional unit. Thus, for example, a multi-function printer/fax/scanner device may have one interface for the endpoints relating to the fax function, a second interface for the endpoints relating to the printer function and a third interface for the endpoints relating to the scanner function.

Data transfers on the bus are packetized. USB supports four kinds of data transfers: control transfers, interrupt transfers, isochronous transfers, and bulk transfers. The USB protocol imposes different requirements on the transmission parameters applicable to these different types of USB data transfers.

Control Transfers:
  Typically, control transfers involve non-periodic transmission of packets and provide best effort delivery.
Interrupt Transfers:
  Typically these are used when a function in a USB device needs attention from the host. So, typically, interrupt transfers are non-periodic and require guaranteed bounded latency. Error detection and next-period retry should be applied for interrupt transfers. The USB specification defines a maximum data payload for interrupt transfers (and this maximum varies depending on the device speed).
Isochronous Transfers:
  Typically these are used to transfer time-sensitive information (e.g. a video stream, an audio stream) and occur periodically and continuously. In this context, delays in packet delivery, or retry of data transmission, would lead to noticeable artifacts in the stream when it is rendered and it may be preferable to drop packets or frames altogether. Thus, isochronous transfers are provided with guaranteed access to a specified bandwidth on the bus, the latency is bounded, there is no application of retry, and no guarantee of delivery. For a given endpoint, an endpoint descriptor may specify the maximum size of data payload that may be involved in isochronous transfers involving this endpoint.
Bulk Transfers:
  Bulk transfers use up unallocated bandwidth on the bus after other types of data transfers have been catered for and, typically, they are used for large data that is not time sensitive (e.g. print data being sent to a printer). So, bulk transfers have no guarantee of a specific bandwidth or latency. However, error detection is performed on bulk transfers (via cyclic redundancy codes) and there should be a guarantee of delivery.

The USB host controller manages use of the bus with a view to ensuring that USB data transfers are performed according to the transmission requirements that apply to the different USB data transfers, taking into account the conditions on the bus (congestion, etc.) at the time. The transmission requirements may include general requirements (use of error detection, guarantee of bounded latency, and so on) that apply to data transfers of this USB transfer type, general requirements that apply to data transfers on this type of USB pipe, particular requirements (e.g. guaranteed bandwidth and so on) that are associated with the specific USB data transfer that is being handled, and so forth. So, it will be understood that when a USB data transfer starts, the USB host controller allocates resources on the physical USB bus to this data transfer in view of the (USB domain) context in which the data transfer is taking place.

The USB host controller may take certain management decisions in order to implement USB data transfers taking into account their respective transmission requirements: for example, the host controller may determine the order of transmission of data packets relating to different data transfers based on the type of the transfer. As another example, when traffic on the bus is heavy the host controller may decide which data packets to drop in order to avoid exceeding the data-transmission capacity of the bus. In addition the USB host controller's management of the bus bandwidth is constrained by certain requirements of the USB specification itself: for example, there may be an upper limit on the percentage of any frame that may be allocated for periodic transfers, and so on.

The USB specification was developed to standardize connections and communications between personal computers (PCs) and local peripherals, with communication taking place over cables and hubs interconnected in a tiered star topography. More recently there have been proposals to allow USB traffic to be transmitted over communications networks of various types. Thus, for example, the USB/IP project aims to allow USB traffic to be transmitted between computers and the like over networks that employ the Internet Protocol (IP networks). The computers (or, more generally, the nodes) communicating USB traffic over the IP network both run application software that is adapted to handle transmission of USB packets over the IP network.

Another proposal to allow USB traffic to be transmitted over networks, Media Agnostic Universal Serial Bus (MA- USB), specifies details of packets that conform to its protocol, and their associated behaviour, but leaves open the nature of the communication network over which the packets may be transmitted. Other proposals in this regard include USBRDIR and RDP protocol. In these cases also, the nodes communicating USB traffic over the network run application software that is adapted to handle transmission of USB packets over the network.

USB traffic may be transmitted over a communications network in various different situations. In some cases there may be a direct connection between a communications network and a USB device, either a physical USB device (for instance a USB printer, a USB keyboard, a still or video camera, a webcam, video projector, game controller, gamepad, oscilloscope, and so on, that has its own network communications interface) or a computer implementing a USB device function. In other cases there may be an indirect connection between a USB device and the communications network over which USB data is to be communicated, and the USB device may be connected by a physical USB bus to a computer which is the node that connects to the communications network. In the latter case the computer may be a proxy, playing the role of USB host relative to the USB device but presenting an interface of the USB device towards a remote device which is the communication partner of the USB device over the communications network.

In the description below, the expression "USB-data-source device" is used to designate a physical device that connects directly to the communications network and which puts onto the communications network transport packets that convey USB packet data, even if there is another device that is the ultimate source of the USB data. In a corresponding way, the expression "USB-data-sink device" is used to designate a physical device that connects directly to the communications network and which receives from the communications network transport packets that contain USB data, even if there is another device which is the ultimate destination of the USB packet data. Even in a "unidirectional" USB data transfer the endpoint which receives USB data transmits back acknowledgement packets, so a USB-data sink device receiving certain USB packets will generally play the role of USB-data source device in relation to other USB packets (and vice versa).

When USB traffic is transmitted over a communications network according to the procedures specified in the existing proposals, the USB packets are forwarded over the communications network in a manner which does not take into account the transmission requirements (e.g. in terms of latency, lack of retry, bandwidth, direction, and so on) which, when data transfers occur entirely in the USB domain, affect the way in which data is transmitted. Thus, when USB packets relating to a particular USB data transfer finally arrive at a receiving node after transmission via a network, and re-enter the USB domain, a sub-optimal condition or failure condition may exist (e.g. the packets may not arrive as early as desired or, indeed, they may arrive too late).

The present invention has been made in the light of the above situation.

Each USB data transfer takes place in a certain context in the USB domain, i.e. each USB data transfer involves particular endpoints, makes use of a particular type of USB pipe and a particular type of USB data transfer, involves USB devices having particular characteristics (e.g. which implement a particular version of the USB protocol, have a particular model/product ID (PID), have a particular values of Class, Subclass and Protocol, have a particular list of interfaces and those interfaces have their own lists of endpoints, each of them having a pipe type, endpoint type, and endpoint properties (e.g. packet size for isochronous endpoints), and so on.

The various features of the USB context entail a set of transmission requirements for the USB data transfer. For example, a particular USB context might entail the following set of 3 transmission requirements for a USB data transfer: guarantee bounded latency, do not apply retry, and use a specified maximum bitrate. It may be considered that the transmission requirements are conditions or constraints that are defined in the USB domain. The invention is not particularly limited having regard to the number of transmission requirements there may be in the set of transmission requirements that apply to a USB data transfer (the number may be one, two, three, and so on).

The present invention exploits quality-of-service (QoS) mechanisms that exist in many different types of network, using them to enable USB packet data that is to be transported over a communications network to be forwarded in the network in a manner that is appropriate to the USB context of the applicable USB data transfer. The manner of forwarding the USB packet data need not take into account all aspects of the USB context of the applicable data transfer, but at least one QoS parameter is assigned dependent on some aspect of the USB context.

QoS mechanisms are implemented in many different wired and wireless networks. The manner of implementing QoS mechanisms may differ between networks that conform to different technical standards (e.g. Ethernet, Internet Protocol and MPLS standards in wired networks, LTE, WiBro and Wi-Fi in wireless networks, as well as other standards). Furthermore, the expression "quality of service" is not always used in the nomenclature that designates the relevant mechanism in different technical standards (although that expression will be used in the present document, irrespective of the technical standard that is implemented in the communications network in which the invention is applied). The common feature of QoS functions is that they enable differentiated levels of service (in terms of traffic quality, i.e. bandwidth and so on) to be guaranteed for different communications on the network. Thus, for example, QoS mechanisms may allow higher priority to be given to live streaming data, which is time sensitive, than to Internet browsing traffic.

The present invention provides a method of transmitting USB packet data over a communications network that forwards transport packets in a differentiated manner based on quality-of-service indicators assigned to the transport packets. Each USB packet forms part of a USB data transfer that arises in a particular USB context and has a respective set of transmission requirements that derive from, or are defined based on, this USB context. Embodiments of the invention expose the USB context of USB packet data, and QoS levels appropriate to the USB context are then selected and assigned to transport packets which convey the USB packet data over the communications network.

More particularly, the present invention provides a USB-packet-data transmission method which comprises:

discriminating, for a transport packet comprising USB packet data, the context of the USB data transfer to which the USB packet data belongs, and assigning, to a transport packet comprising USB packet data, at least one quality-of-service parameter value that depends on the USB context of the USB data transfer to which the USB packet data belongs.

According to the above method, transport packets that contain USB packet data belonging to a USB data transfer are assigned one or more QoS parameters that depend on the USB context of the USB data transfer and so reflect transmission requirements that are defined for this USB data transfer in view of its USB context. In this way, transport packets that contain USB packet data can be forwarded in the communications network in a manner which takes into account the needs of the applicable USB data transfer.

Thus, for example, USB packets which require fast reaction time, in view of the USB context of the USB data transfer to which they belong, may be assigned a QoS parameter value that involves a shorter delay budget, thus increasing the probability that the data arrives in a sufficiently timely manner to assure performance of a desired function and/or sufficiently quickly to enhance the user's real-time experience. USB packets that handle bulk traffic (and, thus, are not time-critical) may be assigned a QoS parameter value that involves a longer delay budget, allowing for more flexible resource allocation in the communications network. USB packets which, according to the USB protocol, are allowed to have higher packet loss ratio may be assigned QoS parameter values that take fewer resources from the communications network.

In the above method, the assigned QoS parameter value may depend on a transmission requirement that is defined in the USB domain as a necessity for a given USB context (e.g. the USB standard may specify this transmission requirement as applicable in a given USB context). On the other hand, in some cases the assigned QoS parameter value may depend on a transmission requirement which a designer has decided is desirable for a given USB context. Thus, for example, a network operator may decide to allocate different priorities to USB data transfers that relate to USB printing and to USB data transfers that relate to user operation of a USB device of HID class ("human interface device" class).

In the above-described method, the discriminating of the USB context of a USB data transfer need not involve determination of all aspects of the applicable USB context; to the contrary it may simply comprise determination of one or more high-level features of the USB context (e.g. the USB transfer type, the USB pipe type, the USB device type, and so on) and/or identification of a specific USB data transfer.

The above-described method may discriminate the USB context of the USB data transfer to which USB packet data belongs using different techniques. For example, in a case where the USB packet data is transported in a transport packet which includes, in its header data, a sub-header or other label that is indicative of the USB context of the USB data transfer, the USB context may be discriminated by parsing the header data of the transport packet. This sub-header or label may, for example, identify the type of the USB data transfer. As another example, the port number and transport protocol type of a host port that outputs a transport packet comprising USB packet data uniquely identifies a USB data transfer taking place between a USB-data source and USB-data sink. So, in some embodiments the specific USB data transfer applicable to USB packet data in a transport packet may be discriminated by discriminating the port number and transport protocol type of the host port that output this transport packet. As yet another example, the USB context of USB data transfers may be discriminated by a deep packet inspection process performed on transport packets.

There are various ways in which a network node that is to discriminate the USB context of USB data transfers that apply to USB packet data in transport packets may become informed of the relationship between transport packets and USB context of USB data transfers. In certain embodiments of the invention the relationship is static and so can be pre-configured, e.g. pre-programmed into a network node. So, for example, a rule may be pre-specified indicating that a particular QoS parameter value that is appropriate for USB bulk transfers should be assigned to all the transport packets that contain USB packet data and are output from TCP port 1001 of the USB-data source. Use of a pre-configured rule typically is suitable for a case where QoS parameter values are assigned based on the type of the applicable USB data transfer, or the type of the applicable USB pipe.

In certain embodiments of the invention the USB-data source device (or the USB-data sink device) transmits, to the network, information indicating what is the relationship between transport packets and USB context. This approach is useful in cases where it is desired to cater for transmission requirements that derive from the USB context but are specific to a particular USB data transfer. So, for example, a computer program (application software, firmware, operating system software, etc.) executing on a processor of the USB-data source device may notify the network that transport packets output from UDP port 1002 relate to a specific USB data transfer which is an isochronous USB transfer with a bandwidth of 32 kbit/s in a particular direction.

The present invention further provides a USB-data source device comprising:
  an interface to a communications network;
  a processor; and
  a computer program comprising machine-readable instructions which, when run on the processor, cause the USB-data source device to output to the communications network, via the interface, transport packets comprising USB packet data, wherein each USB packet forms part of a USB data transfer having a set of transmission requirements;
  characterized in that the computer program comprises machine-readable instructions which, when run on the processor:
  cause the USB-data source device to expose the USB contexts of respective USB data transfers whose USB packet data are comprised in the transport packets.

Because the USB-data source device exposes the USB contexts of respective USB data transfers applicable to the USB packet data in the transport packets output by this source device, nodes of the communications network can set QoS parameter values that are appropriate to the USB-domain transmission requirements that apply to the various USB data transfers.

The USB-data source device may have a computer program that comprises machine-readable instructions which, when run on the processor generate labels indicative of the respective USB transfer types of the USB data transfers whose USB packet data are comprised in transport packets, and include the labels in the transport packets (aggregated with the USB packet data).

The USB-data source device may be configured to transmit to the network information indicative of a relationship between transport packets comprising USB packet data and the USB context of USB data transfers to which the USB packets belong.

The present invention yet further provides the above-mentioned computer program, for example in the form of machine-readable instructions recorded on a non-transitory machine-readable recording medium.

The present invention yet further provides a USB-data sink device comprising:

an interface to a communications network;

a processor; and a computer program comprising machine-readable instructions which, when run on the processor, cause the USB-data sink device to input from the communications network, via the interface, transport packets comprising USB packet data, wherein each USB packet forms part of a USB data transfer having a set of transmission requirements;

characterized in that the computer program comprises machine-readable instructions which, when run on the processor cause the USB-data sink device to output, to the communications network, information indicative of a relationship between transport packets comprising USB packet data and the USB context of USB data transfers to which the USB packets belong.

The present invention yet further provides a node device in a communications network, the communications network being configured to forward transport packets in a differentiated manner based on quality-of-service parameter values assigned to the transport packets, the node device being characterized in that it comprises:

a discrimination module configured to discriminate, for a transport packet comprising USB packet data, the USB context of the USB data transfer to which the USB packet data belongs, and to map transport packets comprising USB packet data to quality of service parameter values based on the USB contexts of the respective USB data transfers to which the USB packets belong.

The node device may be one of various physical devices in the communications network and, indeed, plural node devices having the stated functionality may be present in a given communications network. Thus, for example, the node device may be a device (network interface, modem, etc.) at the interface between a communications network and a USB device, it may be a device in the core network (e.g. a gateway device such as S-GW, P-GW in an LTE network, Broadband Network Gateway (BNG) in a fixed access network, deep packet inspection node), and so on.

The present invention still further provides a communications network configured to forward transport packets in a differentiated manner based on quality-of-service indicators assigned to the transport packets, the communications network being characterized in that it comprises a node device having a discrimination module configured to discriminate, for a transport packet comprising USB packet data, the USB context of the USB data transfer to which the USB packet data belongs, and to map transport packets comprising USB packet data to quality of service parameter values based on the USB contexts of the respective USB data transfers discriminated for said transport packet data.

The above communications network may further comprise a deep packet inspection module, and the deep packet inspection module may be configured to determine, for transport packets comprising USB packet data belonging to a specific USB data transfer, at least one transmission requirement applicable to the specific USB data transfer.

According to various embodiments of the invention the discrimination of the USB context of the USB data transfer to which USB packet data belongs may be performed by different components in the communications network and, indeed, there may be plural nodes within the communication network which perform this discrimination.

Embodiments of USB-packet-data transmission method, USB-data source device, USB-data sink device, computer program, communications network, and node for a communications network according to the invention enable various high level benefits to be obtained, for instance:

optimized network use, more flexible resource allocation, lower latency when needed, and improved user experience.

Further features and advantages of embodiments of the present invention will become apparent from the following description of said embodiments, which is given by way of illustration and not limitation, illustrated by the accompanying drawings, in which.

General principles of certain example embodiments of the present invention will now be described with reference to FIGS. 1 to 5.

Figure 1:
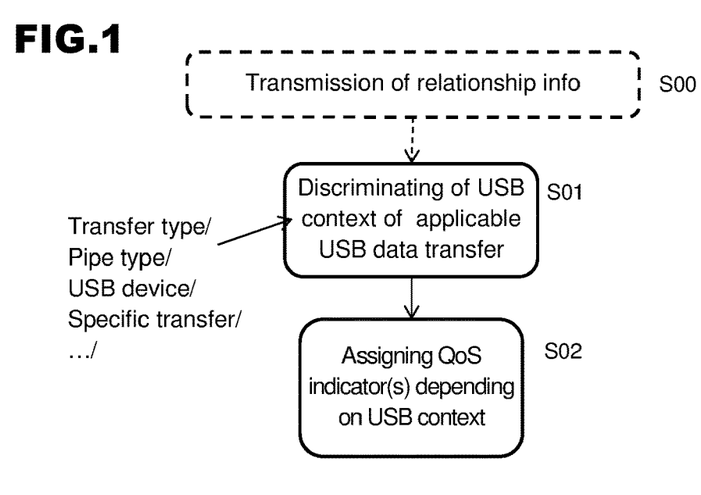
FIG. 1 is a flow diagram illustrating a method of transmitting USB packet data over a communications network, according to an embodiment of the invention.

FIG. 1 illustrates a method of transmitting USB packet data over a communications network which includes a quality-of-service mechanism, according to an embodiment of the present invention. The method of FIG. 1 is implemented in a case where a source of USB data generates transport packets for transmission over the communications network and the transport packets convey USB packet data. The invention is not particularly limited having regard to the number or nature of the USB packets that may be included in each transport packet. Thus, for example, a long USB packet may be split between plural transport packets. As another example, plural USB packets may be carried by a single transport packet. As yet another example, there may be a one-to-one relationship between transport packets and USB packets. As a further example, a group of USB packets may be spread over a number of transport packets that is greater or lesser in number than the number of USB packets in the group.

Typically, a processor of the USB-data source runs a computer program (e.g. application software, firmware, operating system software, etc.) that includes machine-readable instructions which control execution of USB-data transmission over the network in question, performing processes including encapsulation of USB packets in transport packets and output of transport packets to the communications network via a suitable wired or wireless interface. (The computer program may also include instructions to perform USB-data reception via the network, and other functions, but for the time being the discussion focuses on the USB-data transmission functionality).

The method of FIG. 1 enables transport packets that comprise USB packet data belonging to USB data transfers to be forwarded over the communications network in a manner that is adapted to transmission requirements (bounded latency, application of re-try, and so on) that are appropriate to the USB context of the USB data transfers in question. In this method, a transport packet that comprises USB packet data belonging to a USB data transfer has assigned thereto at least one quality-of-service parameter value that depends on a transmission requirement applicable to the USB data transfer.

More specifically, the USB-packet transmission method of FIG. 1 includes a step S01 of discriminating, for transport packets that comprise USB packet data belonging to USB data transfers, the USB context of the USB data transfer to which the USB packet data belongs, and a step S02 of assigning, to a transport packet that comprises USB packet data, at least one QoS parameter value that depends on at least one transmission requirement that is defined for the USB context of the USB data transfer in question. The requisite knowledge of the set of one or more transmission requirements that is applicable to the USB context of a given USB data transfer may be pre-programmed or dynamically determined, as described later on.

Figure 2A:
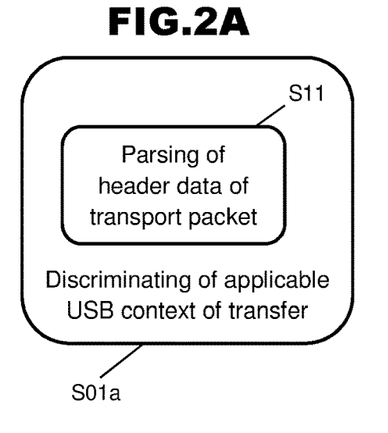
FIGS. 2A, 2B and 2C are diagrams illustrating examples of different ways of implementing a discriminating function of the FIG. 1 method.

The discriminating of the applicable USB context may be implemented in various ways. A first method of performing the discriminating is illustrated in FIG. 2A. According to the example method S01a of FIG. 2A, the applicable USB context is determined by parsing header data of the transport packet that contains USB packet data belonging to the USB data transfer (in a process labelled S11). The method of FIG. 2A is appropriate, for example, in a case where the computer program in the USB-data source device causes output of transport packets which include, in their header data, a sub-header or other label indicative of the USB data transfer to which the USB packets of this transport packet belong. The sub-header or label may be an identifier of the specific individual USB data transfer in question. However, the size of the transport packet header may be kept down, reducing overhead on the communications network, in a case where the sub-header or label is indicative of one, or a limited number of, features of the USB context, for instance the USB transfer type of the relevant USB data transfer and/or the type of the USB pipe conveying these USB packets.

Figure 2B:
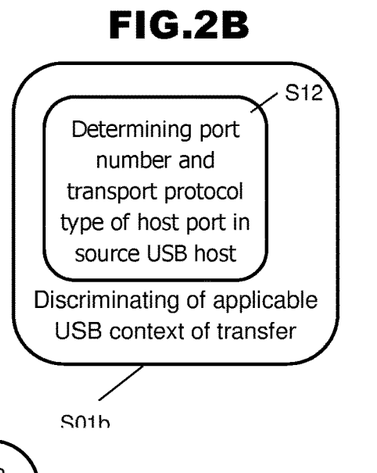

A second method of performing the discriminating process of FIG. 1 is illustrated in FIG. 2B. According to the example method S01b of FIG. 2B, the applicable USB context is determined by determining the port number and transport protocol type of the host port of the device that is the source of the USB data being transported over the communications network (in a process labelled S12). The method of FIG. 2B is appropriate, for example, in a case where there is a known relationship between the host port and protocol which the computer program in the USB-data source device uses to output transport packets and the USB context of the USB data transfer whose USB packet data is transported in the transport packets. This known relationship may be static and pre-programmed into the entity which assigns QoS parameter values to transport packets, or it may be dynamic and notified to the QoS assignment entity at the time when the specific USB data transfer is performed.

In the case of an output port which is capable of outputting non-USB traffic as well as USB traffic, counter-measures may be implemented to avoid the situation where QoS parameter values appropriate to USB traffic are assigned inappropriately to transport packets that contain non-USB traffic. Thus, for example, suitable counter-measures may be integrated into the software that implements the end-to-end communication of USB traffic over the communications network. Some other example ways to avoid application of USB-related QoS rules to non-USB traffic include:—
applying the USB-related rule (e.g. a Traffic Flow Template in an LTE network) only to items of User Equipment which are known to send only USB traffic via the relevant port,
extending the USB-related rule so it applies in the case of a match to the IP address of a device that is known to send or receive only USB traffic via this port
applying the USB-related rule only to a logical connection (VLAN, ATM PVC, mobile network APN . . . ) towards which only USB-related traffic is sent.

Figure 2C:
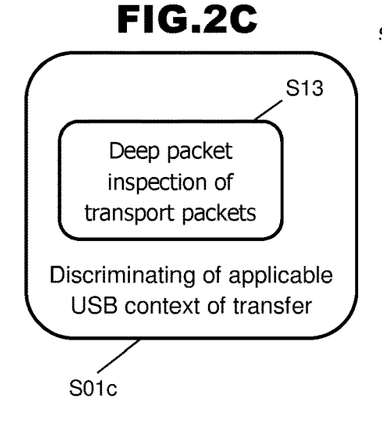

A third method of performing the discriminating process of FIG. 1 is illustrated in FIG. 2C. According to the example method S01c of FIG. 2C, the applicable USB context is determined by deep packet inspection of transport packets transiting on the communications network.

Returning to the overall method of FIG. 1, the process S02 of assigning QoS parameter values to transport packets may associate a QoS label to a transport packet so that the transport packet can subsequently be forwarded through the communications network in a manner which provides the requisite transmission properties. For example, in an LTE network the QoS label may be used to determine which bearer is used for transporting the transport packet. However, it is not essential to have an explicit QoS-label-generation step; instead the assignment of QoS parameters to a transport packet may consist of identifying forwarding parameters (e.g. a bearer) which offer QoS (transmission characteristics) that is appropriate to the USB context of the USB data transfer to which the USB packet data in this transport packet belong.

When assigning QoS parameter values to transport packets which comprise USB packet data belonging to a USB data transfer, in accordance with certain methods embodying the invention, the assignment may take the USB context of the USB data transfer into account to a greater or lesser degree. Thus, in the case of an LTE network, the USB context of the USB data transfer may lead to assignment of a specific value of a QoS parameter (for example a standardized QCI or extended QCI, described below) that corresponds to transmission parameter values that most closely match the transmission requirements that are imposed on this USB data transfer in the USB domain.

As another example, the assigned QoS parameter value may be selected in view of just one of a set of requirements that derive from the USB context applicable to this USB data transfer. For instance, the USB context of the USB data transfer may simply govern whether the assigned QoS parameter value corresponds to a guaranteed bitrate or non-guaranteed bit rate bearer. Various USB-domain transmission requirements may be used as a basis for the assignment of QCI values (or other QoS parameter values) including, but not limited to: the USB-domain transmission requirements that apply to USB pipes of the same type as the USB pipe involved in the current USB data transfer and/or the USB-domain transmission requirements that apply to USB data transfers of the same type (interrupt, isochronous, . . . ) as the current USB data transfer. When a transport packet comprising USB packet data belonging to a USB data transfer is being assigned a QoS parameter value that corresponds to a guaranteed bit rate bearer, values of guaranteed bit rate (GBR) and maximum bit rate (MBR) can be selected based on GBR and MBR values that are specified, in the USB context, for this USB data transfer.

The present invention is not particularly limited with regard to the number of the QoS parameter values that are assigned to a transport packet which are based on USB-domain transmission requirements of the USB data transfer to which belong the USB packet(s) comprised in this transport packet. Examples discussed below refer to the assignment of a value of a single QoS parameter (QCI) in dependence on the USB context of the applicable USB data transfer, but it is to be understood that values for plural QoS parameters may be assigned to a transport packet in dependence on the USB context of the applicable USB data transfer.

The present invention is not particularly limited having regard to how QoS parameter values are set so that they are appropriate for the USB contexts of respective different USB data transfers applicable to USB packet data in transport packets. Typically the selected QoS parameter values take into account the transmission requirements of the endpoints involved in the USB data transfer. For example, the delay budget and ratio of allowed packet loss in the network may be different for each USB endpoint type and so it may be appropriate to specify, for USB data transfers involving the different types of endpoint, respective QoS parameter values that provide the desired combinations of delay budget and ratio of allowed packet loss. As another example, it may be decided, as an option, to undertake resource allocation and admission control, particularly for interrupt and isochronous endpoints.

When it is desired to select QoS parameter values based on the USB transfer type or USB pipe of a USB data transfer it is relatively straightforward to determine the aspects of USB context (USB-domain transmission requirements) that should be taken into account, and typically a static template may be defined for mapping transport packets to QoS parameter values (as described below). However, when it is desired to select QoS parameter values based alternatively or additionally on the specific USB transfer that is taking place, it is not so straightforward to determine all of the applicable USB-domain transmission requirements. The node or module managing QoS parameter values in the network requires information about the transmission requirements of the specific USB data transfer and may acquire this in various ways so as to dynamically define a template for mapping transport packets to QoS parameter values (as described below).

For example, a USB device may supply information about itself (including parameters of its interfaces and endpoints) during the enumeration phase and if this information is communicated over the communications network to a remote USB host then a node performing deep packet inspection (DPI) may listen for the packet exchange that occurs during enumeration and, for example, extract the endpoint information as USB context information applicable to subsequent USB data transfers that involve the relevant USB device. As another example, the transmission requirements may be determined by an exchange of information between the USB-data source or sink device and the node/module managing QoS parameter values. According to the latter example, in a case where a USB device is indirectly connected to the communications network, for instance via an intervening computer which serves as the USB-data source device, then the USB data-source device may extract endpoint information and the like from the USB device during an enumeration phase. In the case of a USB device that is directly connected to the communications network, then the software run by the USB device to implement communication of USB traffic over the communications network may include instructions to cause the USB device to supply details of its interfaces, endpoints, etc.

In view of allocation and de-allocation of resources, it can be valuable for various network nodes to know when a USB data transfer starts and ends. Information regarding USB context may be communicated to network nodes from USB-data source and sink devices dynamically, when the context changes (for example when USB transfers start and stop), not only at the time of setting up a USB connection.

Figure 3A:
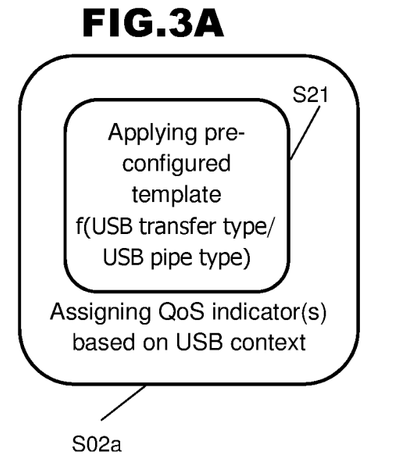
FIGS. 3A and 3B are diagrams illustrating examples of different ways of implementing an assigning function of the FIG. 1 method.

Accordingly, the assigning of QoS parameter values to transport packets depending on the USB context of the applicable USB data transfer may be implemented in various ways. A first method of performing the assigning is illustrated in FIG. 3A. According to the example method S02$a$ of FIG. 3A, transport packets are mapped to QoS parameter values based on a pre-configured template. In the example of FIG. 3A the mapping implemented by the pre-configured template takes into account the USB transfer type and/or the USB pipe type of the USB data transfer applicable to the USB packet data in the respective transport packet.

Figure 3B:
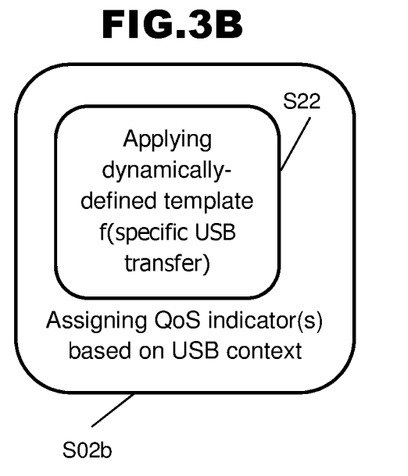

A second method of performing the assigning is illustrated in FIG. 3B. According to the example method S02$b$ of FIG. 3B, transport packets are mapped to QoS parameter values based on a dynamically-configured template. In the example of FIG. 3B the mapping implemented by the dynamically-configured template takes into account the USB context of the specific USB data transfer that is applicable to the USB packet(s) in the respective transport packet. Parameters that may be taken into account include, but are not limited to:

maximum packet size (which influences bitrate for isochronous and interrupt transfers)

interval (for interrupt transfers)

direction (for stream pipe based transfers)

the USB Interface to which the transfer belongs (e.g. identified by values of Device Class, Subclass and Protocol); this sometimes describes the type of the USB device in question (e.g. mass storage or a printer)

the specific model of the USB device (e.g. identified by Vendor ID and Product ID as required by the USB specification); values of Device Class, Subclass and Protocol may also be defined at the Device level instead of at the Interface level, and current state of the transfer (is there a transfer ongoing for a given endpoint)

Figure 4:
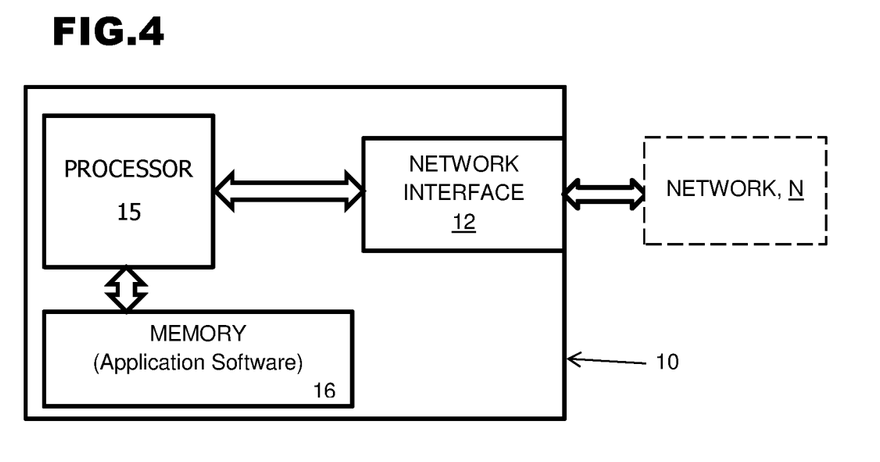
FIG. 4 is a diagram schematically representing a USB-data source device according to an example embodiment of the invention.

A USB-data source device according to an embodiment of the invention is illustrated, in simplified form, in FIG. 4. As represented in FIG. 4, the USB-data source device 10 has a network interface 12 enabling the USB-data source device 10 to transmit data to/receive data from a communications network N. The form of the interface 12 varies depending on the type of the communications network N over which the USB data is to be transported (i.e. wired/wireless, which technical standard the network implements, and so on). Thus, for example, the network interface could be an IEEE 802.11 interface (wireless LAN), an IEEE 802.16 interface (WiMAX), a 3GPP Release 8 E-UTRAN (LTE) interface, a GPON ITU-T G.984.x interface, a VDSL2 ITU-T G.993.x interface, an ADSL ITU-T G.992.x interface, and so on.

The USB-data source device 10 includes a processor 15 and a computer program (application software, firmware, operating system software, etc.) including instructions which, when executed by the processor 15, enable the USB-data source device 10 to transmit USB data over the network N. Typically, the computer program also enables the USB-data source device to receive USB data over the network N because, as mentioned above, the same device may play the roles of source and sink in relation to different USB packets. Typically, the computer program is loaded in a memory 16 of the USB-data source device. However, the invention is not limited with respect to the localisation of the computer program: for example, the program could be recorded on a machine-readable storage medium 170 accessible to the processor 15 either locally or remotely (e.g. over a network connection (not shown)). Similarly, the invention is not particularly limited having regard to the nature of the memory 16 (ROM, RAM, etc.) nor the technology used to implement the memory (SRAM, DRAM, flash memory, memristors, and so on).

The USB-data source device 10 may be a computer, or substantially any other source of USB data that has a network interface and a computer program (application software, firmware, operating system software, etc.) enabling communication of USB data over the network N. The diagram of FIG. 4 is highly simplified and it will be understood that, in practice, the USB-data source may include numerous other functional modules (a user interface, a display device, a bus, and so forth).

Figure 5:
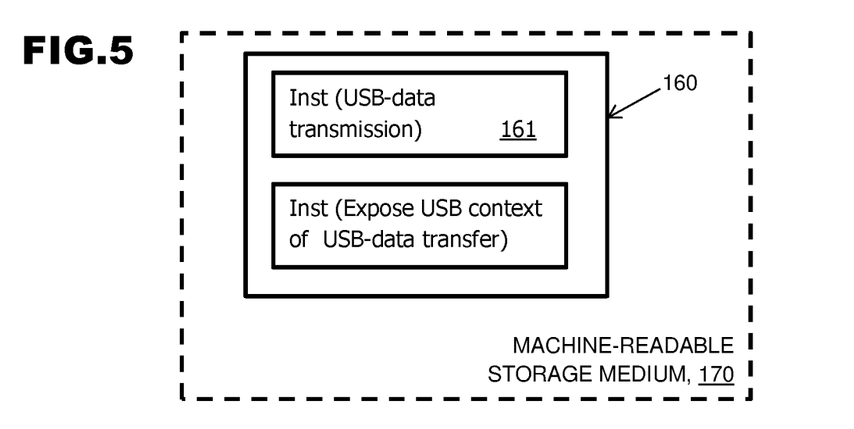
FIG. 5 is a diagram schematically representing a computer program according to an example embodiment of the invention.

FIG. 5 illustrates a computer program according to an embodiment of the invention, which may be used as the computer program of FIG. 4. The computer program 160 includes instructions 161 enabling the USB-data source device to transmit USB data over the network N. The instructions 161 may specify how USB packets are to be encapsulated in transport packets, procedures enabling the USB-data source device 10 to participate in data exchanges with the network n according to network protocols, and so forth. The computer program 160 includes instructions 162 enabling the USB-data source device to expose to nodes of the network N the USB context of the USB data transfer that is applicable to the USB packet data in the transport packets output by the USB-data source device 10.

There are various different manners in which the USB context applicable to the relevant USB data transfer may be exposed. According to one approach the USB context of the USB data transfer is exposed by virtue of including in the transport packet a value that serves as an identifier of some aspect of the USB data transfer in question. As an example, this value may be a label (code, sub-header, etc.) which indicates the type of the USB data transfer (isochronous, interrupt, bulk or control). Such a label may be referred to as a type of service ToS, and it may be included in the header of the transport packet. As another example, the assigned value may serve to distinguish this particular USB data transfer from other USB data transfers that may be taking place between the same pair of USB-data source and sink devices. In the latter case, in the event that the network N is an IP network, this value may be a tuple consisting of the port number and an identifier of the applicable transport protocol type (TCP or UDP).

The exposed USB context is taken into account when assigning a value to at least one QoS parameter. Moreover, although the same QoS parameter values may be used for traffic in the uplink and downlink directions, this is not mandatory; on the contrary, assignment of QoS parameter values may take place separately in the uplink and downlink directions. Thus, for example, it may be appropriate to provide USB-headphones with defined GBR in the downstream direction, while providing a USB-microphone with defined GBR in the upstream direction.

The assignment of QoS values dependent on USB context may be implemented in various nodes of the network (which may include the USB data-source or sink device itself). For example, in an LTE/EPS network specific rules provided by the Mobile Core are applied, in the form of Traffic Flow Templates, by the network interface of the USB-data source device itself. The TFT maps transport packets to LTE bearers according to QoS parameter values that are assigned to those transport packets, at least one of the applicable QoS values being dependent on the applicable USB context. It may be considered that an assignment of QoS parameter values based on USB context is built into the mapping that is performed by the TFT, even though there is no output or generation of an explicit QoS parameter value in respect of each transport packet. Some examples of packet attributes that can be used for filtering with TFT filter include, but are not limited to:

Protocol number (IPv4)/next header (IPv6)
Remote address and mask
Local address and mask
Local port
Remote port
IPSec SPI
TOS (IPv4)/traffic class (IPv6) and mask
Flow label (IPv6)

The values of QoS parameters are of particular importance on entry to access networks, both radio access networks (such as E-UTRAN in LTE systems), and fixed networks (such as DSL or GPON). In the case of a USB-data source/sink that is connected directly to the access network (e.g. it has an LTE modem built-in) then highly efficient use is made of QoS mechanisms in the event that this USB-data source/sink device applies QoS rules itself (i.e. it determines forwarding behaviour based on QoS, taking into account how QoS is assigned to transport packets based on USB context). In the case of a USB-data source/sink that is connected to the access network indirectly (e.g. it is connected to a LAN, and then a DSL modem connects the LAN to DSL access) then may be appropriate for the QoS rules to be applied by the modem.

Some detailed examples will now be described below, with reference to FIGS. 6 to 9, in which certain embodiments of the invention are applied to enable USB traffic to be communicated over an Evolved Packet System (EPS) network (commonly known by names such as Long Term Evolution (LTE) networks, 4G networks, and so on). Some general remarks are presented before describing the detailed example applications.

The LTE network standard is described in the release 8 and 9 series of documents produced by the Third Generation Partnership Project (3GPP) consortium. The present invention is applicable in general to networks supporting this standard (as well as others, see below), irrespective of the particular version/release of the standard that is supported.

In EPS networks, data is transmitted in transport packets that conform to the Internet Protocol (IP) over logical channels referred to as EPS bearers. These transport packets will be referred to below as IP packets. In physical terms, an EPS bearer makes use of radio bearers in the access network (E-UTRAN, Evolved UMTS Radio Access Network), as well as bearers in the core network (EPC, Evolved Packet Core) that conform to various different protocols (for instance S1, S5, S8 protocols).

In order to maximize the efficiency of use of resources in the core and access networks, EPS networks incorporate components and protocols that vary the treatment that is given to EPS-bearer-level packets being forwarded over the EPS network, as a function of network conditions (congestion and so forth) and of the needs of different data communications. For instance, EPS-bearer-level packets being forwarded in the network may receive different treatment in terms of allocated bandwidth, priority, delay budget, how they are handled by scheduling policy, and so on.

Each EPS bearer is allocated one or more QoS parameters to indicate a particular level of service that the network should give to this bearer's packets as they are forwarded through the network. Thus, EPS bearers are assigned a Quality of Service Class Identifier (QCI) and network components/protocols determine how to forward packets of a particular EPS bearer taking into account its assigned QCI. Thus, IP packets that are mapped to the same EPS bearer will receive the same forwarding treatment/quality of service.

In LTE networks, nodes use QCI as a reference to access node-specific parameters that control bearer level packet forwarding treatment (e.g. scheduling weights, admission thresholds, queue management thresholds, link layer protocol configuration, etc.). The operator or vendor of the access node (e.g. eNB) pre-configures the node-specific parameters. These parameters have direct impact on measures such as Packet Delay Budget, Packet Loss and Error Rate.

According to the LTE standard, certain standardized QCI values are assigned to data communications that relate to services of different types. Table 1 below indicates details of typical services that correspond to the standardized QCI values, as well as some of the transmission parameters associated to the QCI values, notably: guaranteed/non-guaranteed bit rate, packet delay budget, packet error loss rate and priority.

TABLE 1

| QCI value | Example service | Guaranteed Bit Rate | Packet delay budget (msec) | Packet error loss rate | Priority |
|---|---|---|---|---|---|
| 1 | Voice, conversational | YES | 100 | $10^{-2}$ | 2 |
| 2 | Video, conversational (live streaming) | YES | 150 | $10^{-3}$ | 4 |
| 3 | Video, non-conversational (buffered streaming) | YES | 300 | $10^{-6}$ | 5 |
| 4 | Real-time gaming | YES | 50 | $10^{-3}$ | 3 |
| 5 | IMS signaling | NO | 100 | $10^{-6}$ | 1 |
| 6 | Voice, video (live streaming), interactive gaming | NO | 100 | $10^{-3}$ | 7 |
| 7 | Voice (buffered streaming) | NO | 100 | $10^{-3}$ | 6 |
| 8 | Email, www traffic, | NO | 300 | $10^{-6}$ | 8 |
| 9 | chat, file transfer protocol, p2p file sharing | NO | 300 | $10^{-6}$ | 9 |

In addition to the standardized QCI values listed in Table 1, the LTE standard supports use of so-called Extended QCI, that is, QCI values above 9 which, if supported by network hardware, may be used for operator-specific configurations.

EPS bearers are selected for IP packets using Traffic Flow Templates (TFT), provided by the EPS system. TFTs map IP packets which have been assigned the same QoS parameter values (e.g. the same QCI) to an EPS bearer which provides the requisite transmission-parameter values, i.e. the desired quality of service.

In certain embodiments of the present invention, components in an LTE network make use of specific TFTs to map IP packets transporting USB packets to EPS bearers. These specific TFTs are configured to perform this mapping based on one or more QoS parameter values which are assigned to the USB packets in view of parameters of the USB context that applies to the USB data transfer to which these USB packets belong. The mapping may be based, for example, on the transport layer port range of the source device, or on a Type of Service (ToS) field aggregated to the USB packet data. Source IP address as well as destination IP address may also be taken into account by the TFT in order to limit this mechanism to selected hosts.

When assigning QoS parameter values (e.g. QCIs) to IP packets comprising USB packets belonging to a USB data transfer, in accordance with methods embodying the invention, the assignment may make use of Extended QCI values which correspond to non-standard QoS level configurations, e.g. non-standard configurations which better match the specifics of USB endpoint types and USB transfer types. So, for example, Extended QCI values may be defined which correspond to combinations of values of packet delay budget and loss rate that match the requirements discussed in the introductory portion of this document for USB transfers of the different types (bulk, isochronous, etc.). As another example, certain Extended QCI values may be defined which correspond to Guaranteed Bit Rate, so that transmission resources may be allocated for specific isochronous transfers. As yet another example, certain Extended QCI values may be defined which correspond to particular values of Priority assigned for particular types of USB device, e.g. based on some criteria defined by the network operator so that different user Quality of Experience may be obtained for different applications (e.g. the network operator may offer a service which delivers a fast USB-over-network printing experience, while file transfer to/from mass storage memory is given lower priority).

Detailed examples will now be described in a case where a source of USB packets transmits the packets over an LTE network to a sink of USB packets. Below, references will be made to USB-data source devices and USB-data sink devices in view of their roles in communicating USB data, but it will be understood that the communication of USB data may not be the only or, indeed, the principal function of the devices in question. In the examples below the USB-data source and USB-data sink devices are both computers, but it will be understood that the invention may be applied more generally. For instance, in the case of a USB device that is directly connected to the communications network this may be substantially any USB device that has a network communications interface (printer with Ethernet port, WiFi-enabled video camera, game controller with built-in LTE, etc.), and includes devices such as mobile telephones, tablets, etc. which emulate USB devices. In the case where a USB device is indirectly connected to the communications network, the USB-data source/sink device may also be a mobile phone, tablet, portable mobile modem with a built in WiFi access point, modem, router, CPE, Set-top-box, and so on.

The example implementations below concern a case where the USB source computer, designated here as Computer A, is connected to an LTE network while the USB sink computer, designated here as Computer B, is connected to a packet data network (PDN). The invention is not limited to this case and, of course, both computers may be connected to the LTE network. The overall structure which interconnects the USB-data source device and USB-data sink device is referred to in this document as "communications network" even in cases where the route from one device to the other travels over plural networks of different types.

Example 1

According to a first example implementation, a pre-defined QCI mapping that takes into account USB context (and transmission-parameter constraints that derive from that context) is statically configured in a Policy Control Enforcement Function (PCEF) of the LTE network. This QCI mapping may be restricted so that it is only applied in respect of IP packets if those IP packets originate from some selected users (User Equipment, UE). The QCI mapping maps IP packets that contain USB data to QoS levels, according to some pre-defined rules (e.g. rules based on specific TCP/UDP port numbers, rules based on specific ToS field values). The QCI mapping may include an assumption that all of the traffic of the relevant users (User Equipment) that matches these rules carries USB packets.

The invention is not limited to the case where the QCI mapping is configured in PCEF, to the contrary the QCI mapping may be configured in other network components, e.g. it may be provisioned on the Home Subscriber Server (HSS).

Computer A is enabled to transmit USB data over the communications network by virtue of the fact that computer A runs special application software comprising instructions to implement USB-over-network transmission. In this example, there is a known relationship between the IP packets that are output by the USB-over-network application software and the USB context of the USB packets transported by those IP packets. For example, there may be a known relationship between types (interrupt, bulk, etc.) of USB transfers and the TCP/UDP ports that the USB-over-network application software uses for outputting IP packets comprising the USB packets of the USB transfers. The QCI mapping exploits this known relationship.

In this example implementation, the QCI mapping involves QoS levels that are assigned, to IP packets that contain USB packet data belonging to a particular USB data transfer, based on the type of the USB data transfer involved in this case. It may be that at the application level which implements the USB protocol, some other parameter values were defined for this specific individual USB data transfer but, in this example, such other constraints are not taken into account.

Example 2

Figure 6:
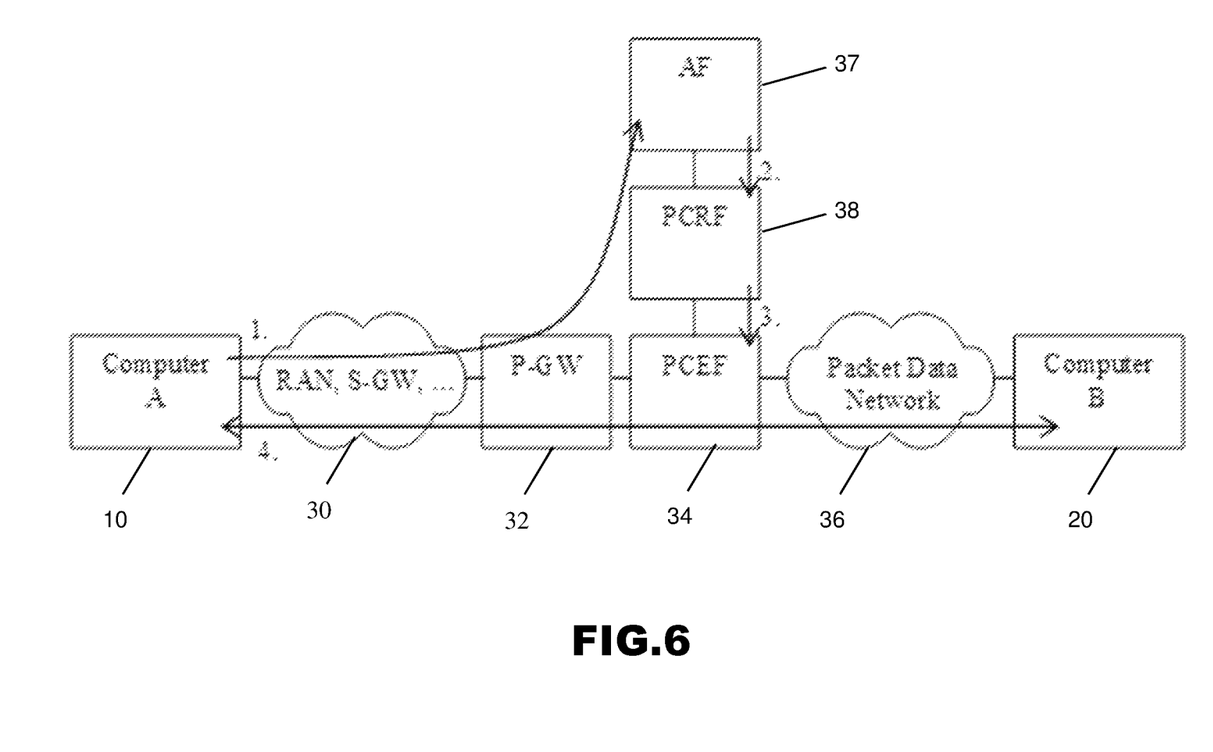
FIG. 6 is a diagram illustrating a communications network and USB-data source and sink devices implementing a method according to an example implementation of the invention.

FIG. 6 illustrates a configuration including USB-data source and sink devices and a network, according to a second example implementation. In this example Computer A, i.e. a source computer 10, communicates with an application function (AF) 37 in an LTE network. In this example the LTE network comprises, amongst other elements, a radio access network and serving gateway (S-GW) portion 30 to which Computer A is connected, as well as a packet data network gateway (P-GW), associated Policy Charging Enforcement Function (PCEF), Policy and Charging Rules Function (PCRF) and Application Function (AF) labelled 34, 38 and 37, respectively, in FIG. 6. This procedure may, for example, be implemented by a method including the following processes:

1. Computer A communicates with a Platform 37 which has a role of Application Function (AF). This communication is to exchange (or negotiate) information about USB traffic and the relation between IP packets and the USB contexts of the USB data transfers of the USB packets transported in those IP packets. The invention is not particularly limited having regard to the structure used to implement the platform 37 that puts the application function AF into practice. As one example, the platform 37 may comprise an application (or group of applications) implemented on a server (not shown) contactable at a known network address.
2. AF chooses QoS levels appropriate to USB traffic transmitted by Computer A, as well as rules for applying these QoS levels. AF sends this information to the PCRF 38 of the LTE network.
3. PCRF requests application of the rules for QoS selection by a Policy Charging Enforcement Function (PCEF) 34 of the LTE network.
4. USB packets are exchanged between Computer A and Computer B using the Internet Protocol (IP). PCEF 34 ensures that appropriate QoS levels are assigned to IP packets carrying USB packet data.

Figure 7:
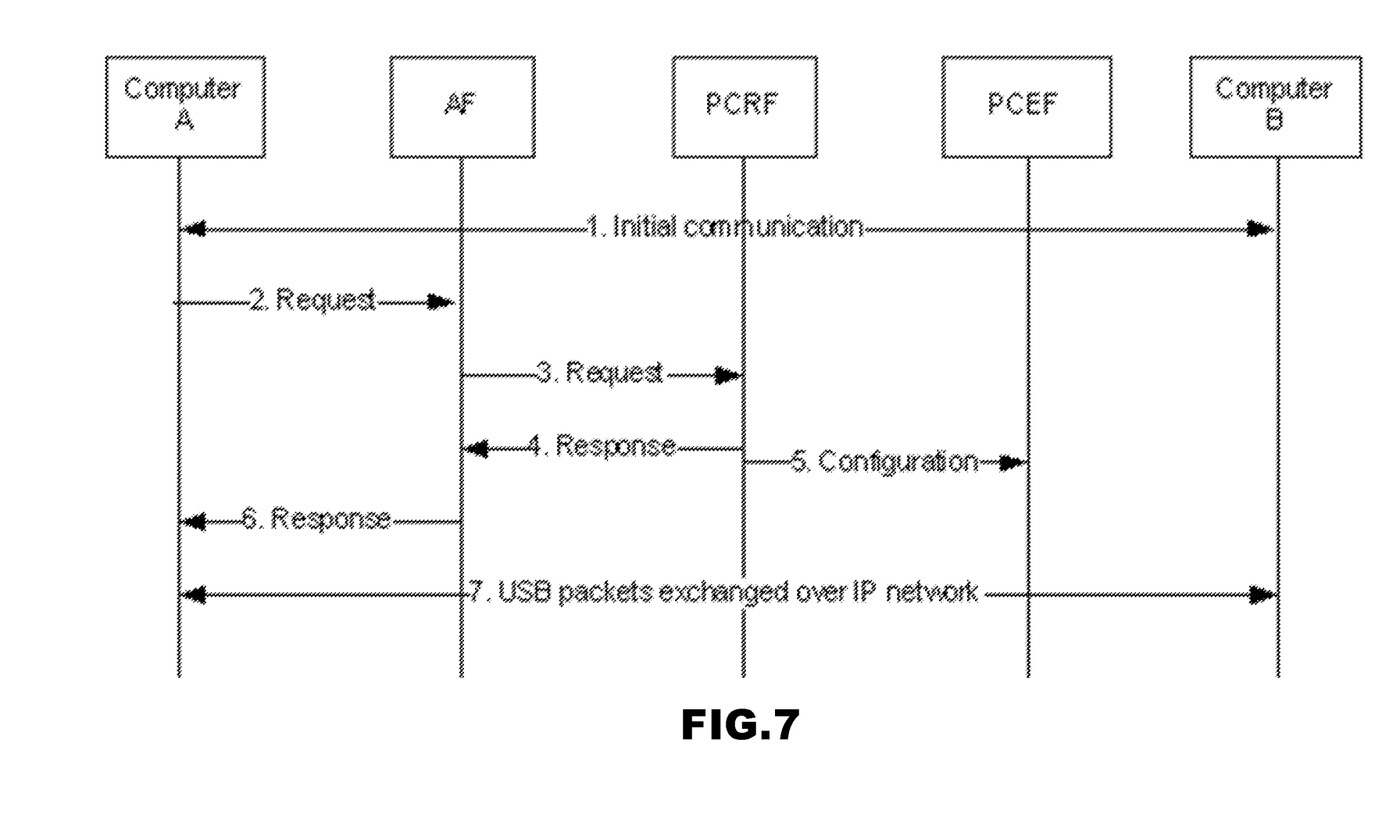
FIG. 7 is a diagram illustrating information flows between USB-data source and sink devices and elements of a communications network, according to an extended version of the example of FIG. 6.

The general procedure according to example 2 may be extended into a more detailed version which includes initial communication between the USB source and sink devices (here, Computers A and B) and feedback to Computer A regarding the behavior of the PCRF. FIG. 7 illustrates various exchanges which take place between the USB-data source and sink devices, and certain functions in the mobile network core, during implementation of this extended version of example 2.

The exchanges illustrated in FIG. 7 include the following processes:

1. Initial communication (optional step): Computer A communicates with Computer B, initiating transmission of USB packets over the LTE network. In this example Computer A is acting as USB host and Computer B as a USB device and computer A may perform this communication to enumerate the USB device and e.g. discover bitrate requested by the USB device for an isochronous transfer.
2. Computer A expresses the QoS requirements of its USB transfers in the form of requests sent to AF 37. These requests may explicitly specify QoS requirements (e.g. request a particular delay budget) or they may transmit information about the USB contexts of the transfers. These requests also include information indicating the relationship between IP packets and the USB context of the USB data transfers applicable to the USB packets in the IP packets.
3. AF 37 chooses QoS parameter values appropriate to USB traffic transmitted by Computer A, as well as rules for applying these QoS parameter values. AF sends this information to Policy and Charging Rules Function (PCRF) 38 within a request to reserve needed network resources.
4. PCRF 38 performs resource reservation and informs AF 37 about reserved resources.
5. PCRF 38 requests the Policy and Charging Enforcement Function (PCEF) 34 to apply the rules for QoS selection.
6. AF 37 informs Computer A about the effect of the resource reservation.
7. USB packets are exchanged between Computer A and Computer B using the Internet Protocol. PCEF 34 ensures that appropriate QoS levels are assigned to IP packets carrying USB packet data.

In a case where admission control is taken into account (i.e. PCRF may deny some QoS level resulting from a request by Computer A), it is appropriate for Computer A to have the role of USB Host (i.e. Computer B has the role of USB Device). This is because, in the USB protocol, the USB Host is in control of transmission resources. Otherwise, required behavior (e.g. cessation of USB transfer) may be emulated using other means available in the USB protocol.

Example 3

Figure 8:
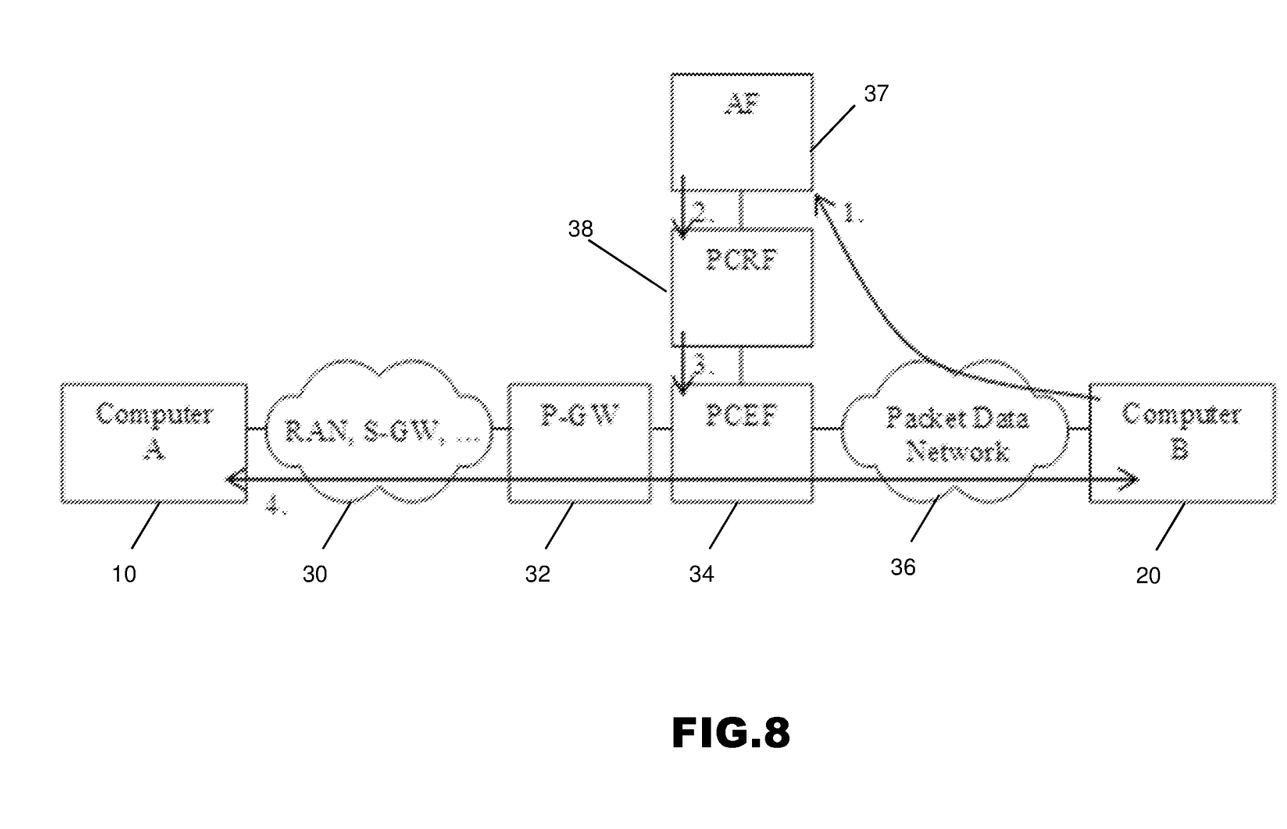
FIG. 8 is a diagram illustrating a communications network and USB-data source and sink devices implementing another method according to an example implementation of the invention.

This example implementation is illustrated in FIG. 8 and may make use of USB-data source and sink devices, and network components, of the same general type as those used in the example of FIG. 6. Accordingly, FIG. 8 uses the same reference numerals as FIG. 6.

This third example implementation involves reporting (or negotiating) by the remote Computer B to the Application Function AF, according to the following steps:
1. Computer B communicates with a Platform 37 which has a role of Application Function (AF). This communication is to exchange (or negotiate) information about USB traffic and the relationship between IP packets and the USB context of USB packet data transported in the IP packets.
   In this scenario AF 37 is accessible for Computer B from a Packet Data Network 36 to which Computer B is connected.
2. AF 37 chooses QoS levels appropriate for USB traffic transmitted by Computer A as well as rules for applying them. AF 37 sends this information to the Policy and Charging Rules Function (PCRF) 38.
3. PCRF 38 requests Policy and Charging Enforcement Function (PCEF) 34 to apply the rules for QoS selection.
4. USB packets are exchanged between Computer A and Computer B using IP packets. PCEF 34 ensures that appropriate QoS levels are assigned to IP packets carrying USB packet data (i.e. PCEF 34 ensures use of EPS bearers providing the appropriate QoS).

Initial communication and feedback from PRCF may be handled analogously to the description for Example 2.

Example 4

Figure 9:
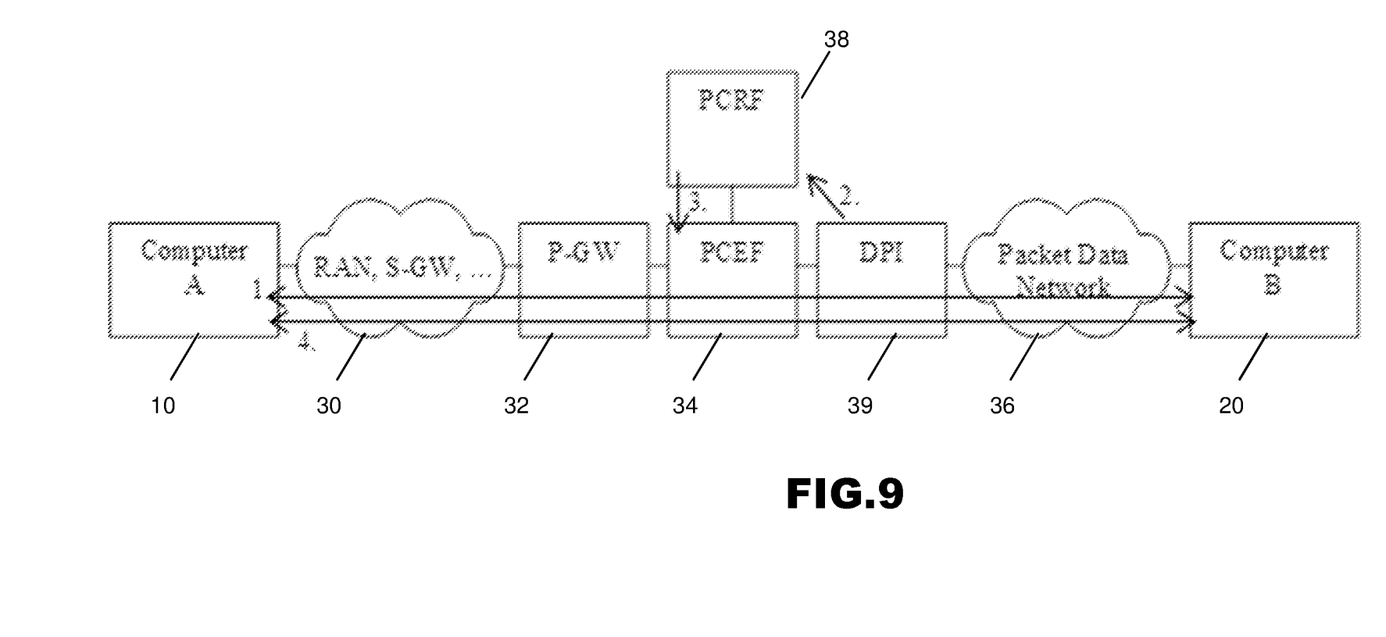
FIG. 9 is a diagram illustrating a communications network and USB-data source and sink devices implementing yet another method according to an example implementation of the invention.

This example implementation is illustrated in FIG. 9 and is based on the use of Deep Packet Inspection (DPI). This fourth example may make use of USB-data source and sink devices, and network components, of the same general type as those used in the example of FIG. 6, with the addition of a DPI node 39 in the communications network. Accordingly, FIG. 9 uses the same reference numerals as FIG. 6 for the elements that are present in both examples.

In the context of 3GPP classification the DPI node 39 may be called a Traffic Detection Function (TDF).

This method according to this fourth example involves the following steps:
1. Communication between Computer A and Computer B is started, initiating transmission of USB packets over network. A protocol for transmitting USB packets over the network, which is known to the network operator (or equipment vendor) is used by Computer A and Computer B. This traffic is forwarded through the DPI node 39.
2. The DPI node 39 detects USB packets being transmitted over the network. DPI node 39 finds network-based characteristics of the packets (e.g. IP address+TCP port). Optionally DPI node 39 does marking for those packets (e.g. VLAN P-bit or IP ToS bits). The DPI node 39 sends this information to the Policy and Charging Rules Function (PCRF) 38.
3. PCRF 38 requests the Policy and Charging Enforcement Function (PCEF) 34 to apply the rules for QoS selection.
4. USB packets are exchanged between Computer A and Computer B using IP packets. PCEF 34 ensures that appropriate QoS levels are assigned to IP packets carrying USB packets.

The description given above with reference to FIGS. 6 to 9 relates to examples in which USB traffic is communicated over an EPS network. However, the present invention is applicable in general to cases where USB traffic is communicated over a network that has mechanisms for assigning different levels of service to different messages (irrespective of whether those mechanisms are named "quality of service" mechanisms or named in some other way).

Thus, as another illustrative example, the present invention may be applied in a case where USB packets are transmitted over an IEEE 802.11 wireless network, using Wireless Multimedia Extensions (WME). In this example, the USB contexts applicable to particular USB packets may be mapped to WME Access Categories. Other examples include transmission of USB traffic over other networks with wireless access (for instance 3G networks, high speed packet access (HSPA) networks, IMT-Advanced networks, and so on) and over networks with fixed access (for instance passive optical networks (including GPONs, EPONs), very-high-bit-rate digital subscriber line (VDSL), and so on).

Although the present invention has been described above with reference to certain specific embodiments, it will be understood that the invention is not limited by the particularities of the specific embodiments. Numerous variations, modifications and developments may be made in the specified embodiments within the scope of the appended claims.

The invention claimed is:
1. A method of transmitting data in Universal Serial Bus (USB) packets in one or more transport packets, over a communications network, executed by a node of the communications network, the communications network configured to forward transport packets in a differentiated manner based on quality-of-service parameter values assigned to the transport packets, each USB packet forming part of a USB data transfer having a respective set of transmission requirements derived from a USB context of the USB data transfer, the method comprising:
   parsing header data of one of the transport packets being output by a USB-data source device to identify the USB context of the USB data transfer by detecting a label administered by the USB-data source device, the transport packet comprising the data in USB packets, the label indicating at least one of:
   a USB transfer type of the USB data transfer,
   a USB pipe of the USB data transfer,
   the specific USB data transfer, and
   a USB device type and model of a USB device participating in the USB data transfer, and
   assigning, to the transport packet comprising the data in USB packets, at least one quality-of-service parameter value, the quality-of-service parameter that depends on the USB context of the USB data transfer.
2. The method of claim 1, wherein identifying the USB context of the USB data transfer to which the data in USB packets belongs comprises identifying at least one of:

a source port number, a source address and transport protocol type of a host port that output the transport packet comprising data in USB packets, a destination port number, a destination address, and a session, stream or sub-stream identifier, an authentication token field, next header type, type of service, traffic class, or flow label of the transport packet.

3. The method of claim 1, wherein identifying the USB context of the USB data transfer to which the data in USB packets belongs comprises performing deep packet inspection of transport packets.

4. The method of claim 1, further comprising transmitting to the communications network, by a source or sink of USB data, information indicative of a relationship between transport packets comprising USB packets and the USB context of USB data transfers to which the data USB packet data belongs.

5. The method of claim 1, wherein assigning the at least one quality-of-service parameter value comprises applying a pre-configured template to map transport packets comprising data in USB packets to quality-of-service parameter values that depend on at least one of:

a USB transfer type, a USB pipe, a maximum packet size, an interval, a direction of transfer, a USB Interface, and a USB device specific model of the USB data transfer to which the data in the USB packets belongs.

6. The method of claim 2, wherein assigning the at least one quality-of-service parameter value comprises mapping transport packets comprising USB packet data to quality-of-service parameter values that depend on the specific USB data transfer to which the USB packet data belongs.

7. A Universal Serial Bus (USB)-data source device comprising:

a communications network interface;

a processor; and a non-transitory storage device having stored thereon machine-readable instructions which, when the machine-readable instructions are executed by the processor of the USB-data source device, cause the USB-data source device to:

output to a communications network, via the communications network interface, transport packets comprising data in USB packets, each USB packet forming part of a USB data transfer having a set of transmission requirements; and transmit a label to a network node of the communications network by:

generating labels indicated of at least one of:

a USB transfer type of the USB data transfer, a USB pipe of the USB data transfer, the specific USB data transfer, and a USB device type and model of a USB device participating in the USB data transfer;

aggregating USB packets of a USB data transfer with the label generated for that USB data transfer; and causing the USB-data source device to output, to the network node, transport packets comprising the aggregated data.

8. The device of claim 7, wherein the machine-readable instructions, when executed by the processor, cause the USB-data source device to output, to the communications network, at least one of:

information indicative of a relationship between transport packets comprising data in USB packets and the USB contexts of respective USB data transfers to which the USB packets, and information indicative of changes of state of these USB data transfers.

9. A non-transitory storage device having stored thereon machine-readable instructions which, when the program is executed by a processor of a Universal Serial Bus (USB) data source device having a communications network interface, cause the USB-data source device to:

output to a communications network, via the interface, transport packets comprising data in USB packets, each USB packet forming part of a USB data transfer having a set of transmission requirements; and transmit a label to a network node of the communications network by:

generating labels indicated of at least one of:

a USB transfer type of the USB data transfer, a USB pipe of the USB data transfer, the specific USB data transfer, and a USB device type and model of a USB device participating in the USB data transfer;

aggregating USB packets of a USB data transfer with the label generated for that USB data transfer; and causing the USB-data source device to output, to the network node, transport packets comprising the aggregated data.

10. A node device in a communications network, the communications network configured to forward transport packets in a differentiated manner based on quality-of-service parameter values assigned to the transport packets, the node device comprising a processor and a memory, the node device configured to:

parse header data of a transport packet being output by a USB-data source device, the transport packet comprising data in USB packets, to identify a USB context of a USB data transfer to which the data in the USB packets belongs, to identify a label administered by the USB-data source device, the label indicative of at least one of:

a USB transfer type of the USB data transfer, a USB pipe of the USB data transfer, the specific USB data transfer, and a USB device type and model of a USB device participating in the USB data transfer, and map transport packets comprising USB packet data to quality of service parameter values based on respective USB contexts of the USB data transfers to which the USB packet data belongs.

11. A communications network comprising the node device of claim 10, the communications network configured to forward transport packets in a differentiated manner based on quality-of-service parameter values assigned to the transport packets.

* * * * *